(12) United States Patent
Hsieh et al.

(10) Patent No.: US 8,535,078 B2
(45) Date of Patent: Sep. 17, 2013

(54) ELECTRICAL CONNECTOR WITH A COVER TRANSITIONALLY ASSEMBLED ON AN INCLINED SLIDING SLOT

(75) Inventors: Wen-Yi Hsieh, New Taipei (TW); Ming-Lun Szu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 90 days.

(21) Appl. No.: 13/335,961

(22) Filed: Dec. 23, 2011

(65) Prior Publication Data

US 2012/0164887 A1 Jun. 28, 2012

(51) Int. Cl.
*H01R 13/62* (2006.01)

(52) U.S. Cl.
USPC .......................................... 439/331; 439/630

(58) Field of Classification Search
USPC ................... 439/266, 267, 312, 331, 630
See application file for complete search history.

(56) References Cited

U.S. PATENT DOCUMENTS

| 7,270,559 | B1 | 9/2007 | Chen | |
| 7,837,488 | B2* | 11/2010 | Wu | 439/188 |
| 7,887,357 | B1* | 2/2011 | Yang | 439/331 |
| 7,892,029 | B2* | 2/2011 | Wang et al. | 439/607.32 |
| 7,963,788 | B2* | 6/2011 | Hsu et al. | 439/331 |

* cited by examiner

*Primary Examiner* — Khiem Nguyen
(74) *Attorney, Agent, or Firm* — Wei Te Chung; Ming Chieh Chang

(57) ABSTRACT

An electrical connector includes an insulative housing defining a mounting face, a pair of pivotal grooves on opposite sides of a rear end of the housing and a pair of locking recesses in front of the pivotal grooves respectively; a plurality of contacts arranged in the housing and a metal shell defining a pair of pivotal posts assembled in the pivotal grooves and a pair locking tabs to couple with the pair of locking recesses in a condition that the metal shell rotates to cover on the insulating housing and move forwards. The pair of pivotal posts therebetween defines an axis paralleling to the mounting face and the axis of the pair of pivotal posts is closer gradually to the mounting face during forward movement of the metal shell.

6 Claims, 5 Drawing Sheets

ELECTRICAL CONNECTOR WITH A COVER TRANSITIONALLY ASSEMBLED ON AN INCLINED SLIDING SLOT

BACKGROUND OF THE INVENTION

1. Field of the Invention

The present invention relates to an electrical connector, and more particularly to an electrical connector with a cover rotatably assembled on an insulating housing with a shaft transitionally moving between a first position in which the cover is closed to the housing, and a second position in which the cover is lifted up away from the housing.

2. Description of the Related Art

U.S. Pat. No. 7,270,559 issued to Cheng-Yi Chen on Sep. 18, 2007 discloses a conventional electrical card connector for mounting onto a PCB board. The electrical connector comprises an insulating housing, a plurality of contacts and a metal shell pivotally connected to the housing. The housing includes a pair of sidewalls and each sidewall defines a first groove having a guiding opening and a second groove in the front of the first groove. The shell defines a pair of columns which are placed into the grooves via the guiding openings and slide in the first and second grooves. After the shell rotates from a slantwise opened position to a horizontal closed position, the shell is needed to move forwards so that a front extending tab on the shell is inserted into a recess on the sidewall of the housing which will prevent the shell from being removed away from the housing in the upright direction. During the rotation of the shell with respect to the housing, the PCB board is easily scratched by the shell, which will result that the shell can not rotate smoothly, and the connector will wear accelerately.

In view of the above, a new electrical connector that overcomes the above-mentioned disadvantages is desired.

SUMMARY OF THE INVENTION

Accordingly, an object of the present invention is to provide an electrical connector with an improved sliding slot by which a process of the cover to the housing is convenient.

To fulfill the above-mentioned object, an electrical connector includes an insulative housing defining a mounting face, a pair of pivotal grooves on opposite sides of a rear end of the housing and a pair of locking recesses in front of the pivotal grooves respectively; a plurality of contacts arranged in the housing and a metal shell defining a pair of pivotal posts assembled in the pivotal grooves and a pair locking tabs to couple with the pair of locking recesses in a condition that the metal shell rotates to cover on the insulating housing and move forwards. The pair of pivotal posts therebetween defines an axis paralleling to the mounting face and the axis of the pair of pivotal posts is closer gradually to the mounting face during forward movement of the metal shell.

Other objects, advantages and novel features of the invention will become more apparent from the following detailed description when taken in conjunction with the accompanying drawings.

DETAILED DESCRIPTION OF THE PREFERRED EMBODIMENT OF THE INVENTION

Figure 1:
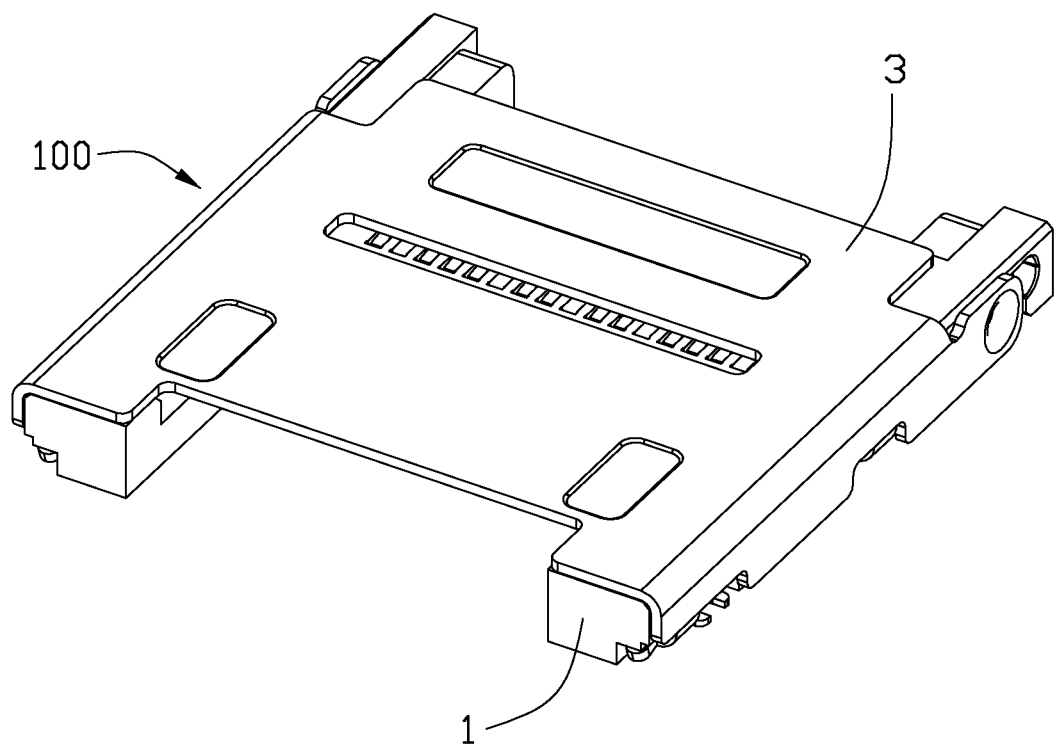
FIG. 1 is a perspective view of an electrical connector of the present invention which is in a closed position.

Reference will now be made to the drawings to describe the present invention in detail.

Referring to FIGS. 1-4, an electrical connector 100 for receiving a card-like component or similar module (not shown) therein, comprises an insulative housing 1, a plurality of contacts 2 secured in the housing 1, a metal shell 3 rotatably assembled onto the housing 1 and a pair of mounting pads 4 for securing the housing 1 onto a PCB board (not shown).

Figure 2:
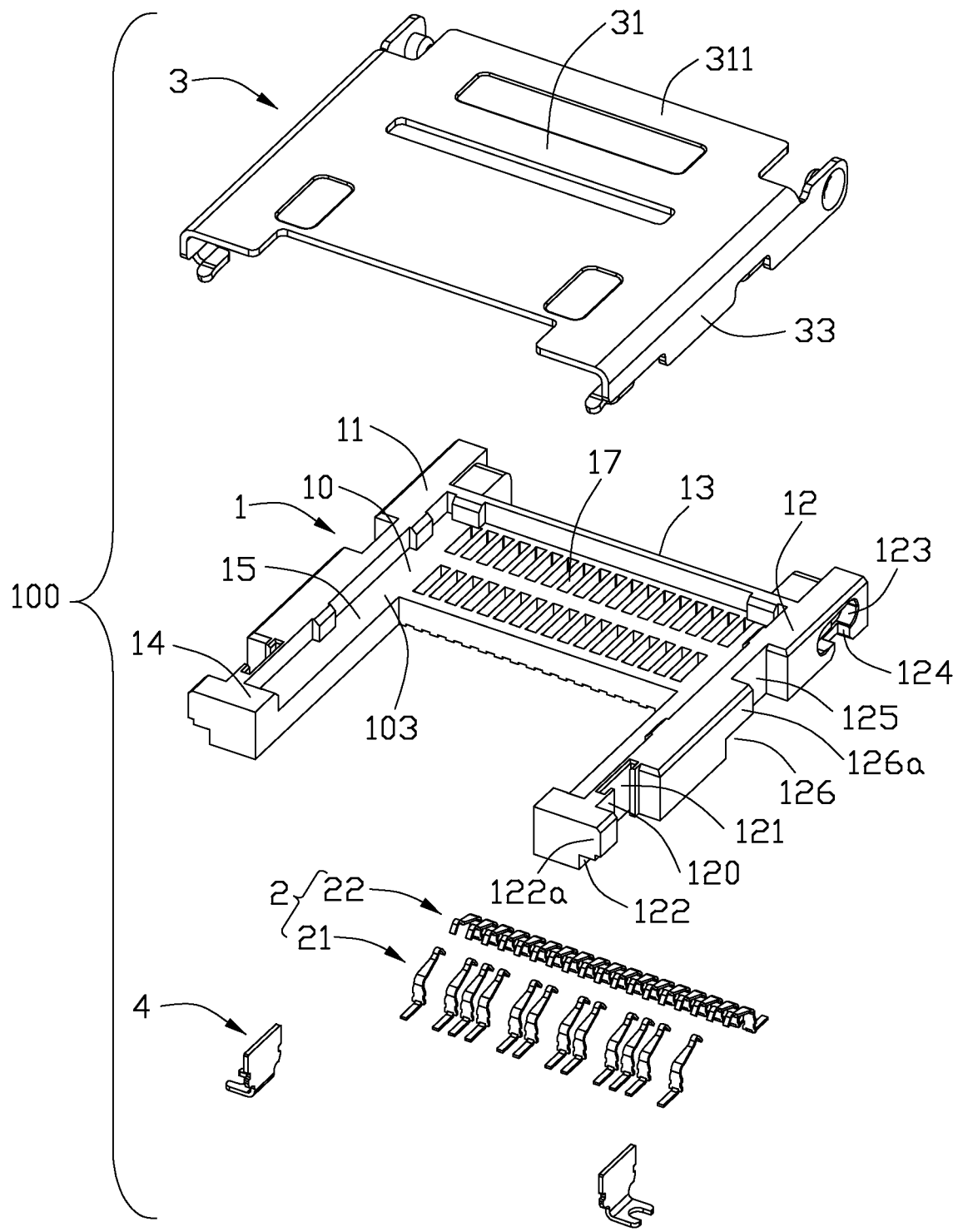
FIG. 2 is an exploded view of the electrical connector.
Figure 3:
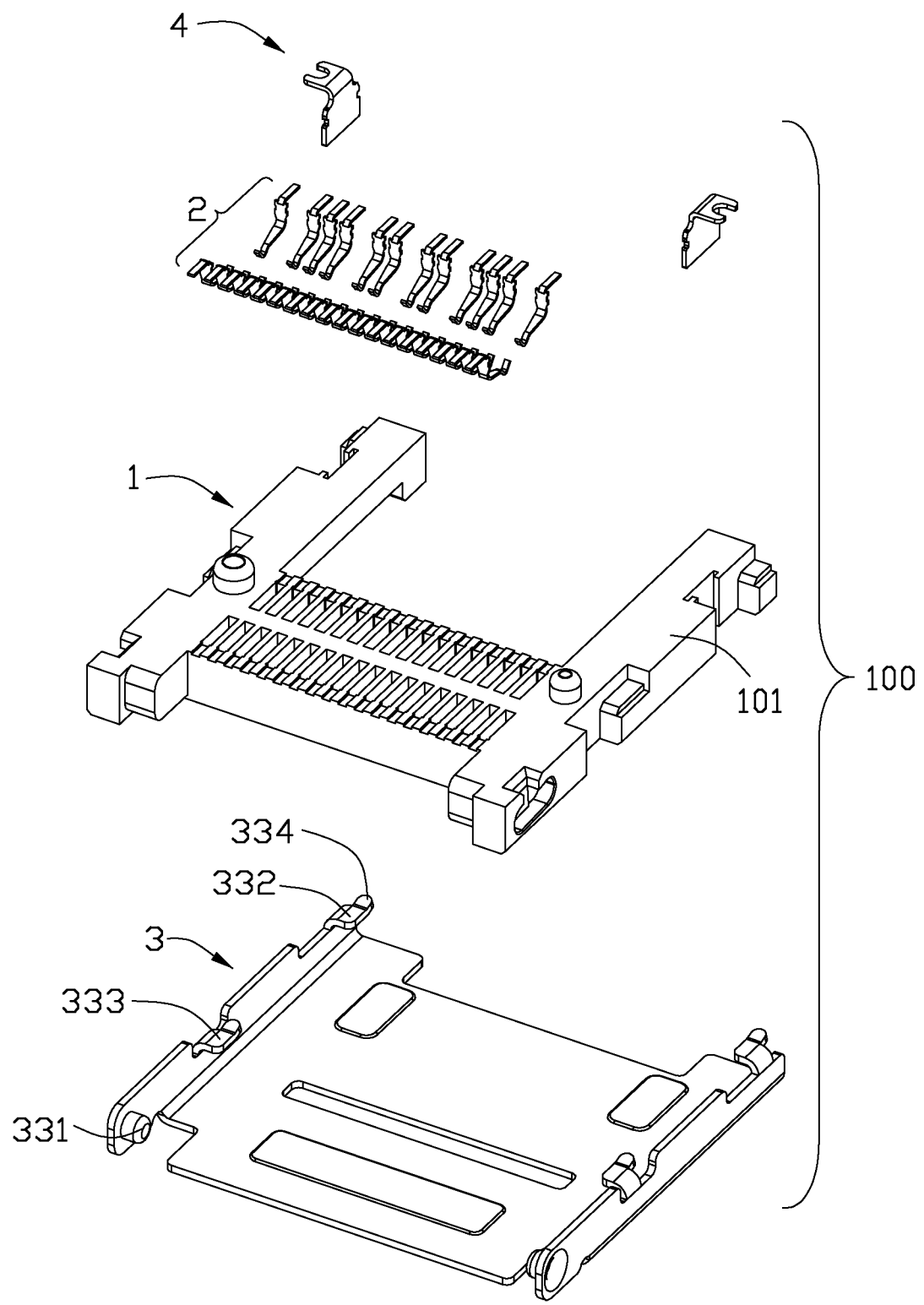
FIG. 3 is another exploded view of the electrical connector.
Figure 4:
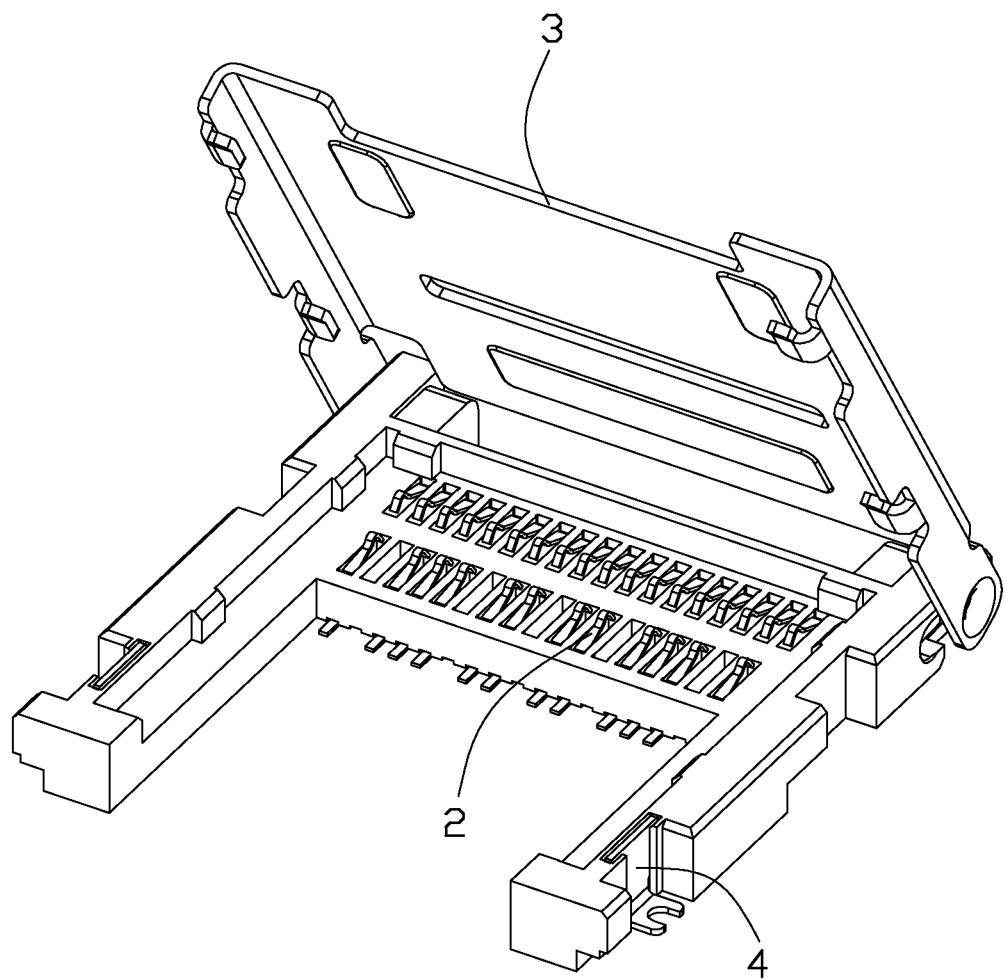
FIG. 4 is a perspective view of the electrical connector which is in an opening position.

Referring to FIGS. 2-3, the insulating housing 1 comprises a bottom wall 10 and a plurality of peripheral walls 11 extending upwards from the bottom wall 10 commonly defining a receiving room 15 to receive the module (not shown). The peripheral walls 11 include a pair of sidewalls 12 on the two opposite sides of the bottom wall 10 and a rear wall 13 bridging the two sidewalls 12. The bottom wall 10 defines a plurality of contact-receiving grooves 17 running through a bottom face 101 and a top face 103 thereof to receive the contacts 2. Each sidewall 12 defines a pivotal groove 123 tilt toward the mounting face during a rear-to-front direction.

The contacts 2 are assembled into the contact-receiving grooves 17 from the bottom face 101 of the housing 1 and arranged in two rows 21,22. Each contact 2 includes a contacting section (not labeled) extending into the receiving room 15 and a soldering section (not labeled) extending along the bottom face 101 for being soldered onto the PCB board (not shown).

The shell 3 comprises a top plate 31 and a pair of side plates 33 extending downwards from two sides of the top plate 31. A pair of pivotal posts 331 are forming at rear ends of two side plates 33 and facing inward. The pivotal posts 331 are placed into the corresponding pivotal grooves 123 via a guiding openings 124 opening to the bottom face and slide in the pivotal grooves 123. The pivotal posts 331 are forced to move toward the mounting face according to the pivotal grooves 123.

Each sidewall 12 of the housing 1 further defines two first recesses 120, 125 running through the bottom and top faces 101,103 of each sidewall 12 along the front to rear direction, one first recess 125 is near to the pivotal groove 123 and two second recesses 122,126 extending forward from the first recesses 120,125 so that the corresponding first and the second recess form a L-shaped recess. Each first recess 120 further extending inward to form a pad-receiving slot 121 for securing a mounting pad 4. A pair of corresponding stopping portions 122a, 126a is relatively formed at the corner of the corresponding L-shaped recesses and the second recesses 122,126 are located under the stopping portions. The shell 3 further includes two pair of locking elements 332,333 formed from bottom edges of the side plates 33 and bending inward. Each locking element has a free tab 334 extending horizontally from a front side to the pivotal post 331 and bending downwards. When the locking elements 332,333 are placed in the second recesses 122,126, and the locking elements are abut against the bottom faces of the stopping portions 122a, 126a and the tabs 334 are resisted on front faces of the second recesses 244 to secure the housing 1 and the shell 3. During the shell 3 is assembled to the housing 1, the locking elements 332,333 are inserted into the first recesses 120,125 and then move forwards into the second recesses 122,126.

Figure 5:
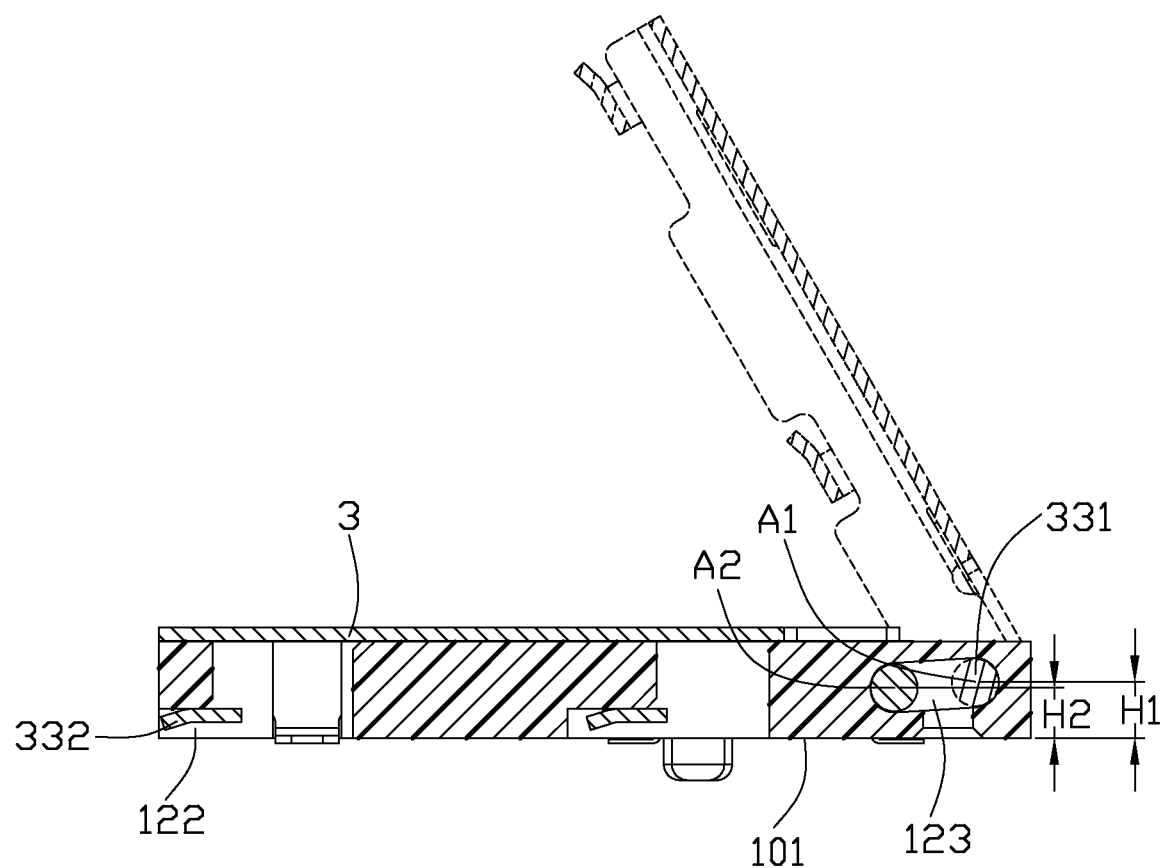
FIG. 5 is a side schematic view of the electrical connector with a shell shown in an unlocked position in dashed line and a locked position in solid line.

The shell 3 includes a positioned portion 311 extending horizontally from a rear edge of the top plate 31. Referring to FIG. 5, when the shell 3 is opened, the pivotal elements 331 seat near the guiding opening 124 and the positioned portion 311 is resisted on the rear wall 13 to keep an angle between the housing 1 and the shell 3 at 90 degrees to 135 degrees so that the shell 3 can not be rotated excessively thus avoiding any damage being caused to the electrical connector. After the module (not shown) is placed into the receiving room 15 and then the shell 3 is rotated downwards around the pivotal elements 331 until the shell 3 is parallel to the housing 1 wherein the locking elements 332,333 are accommodated in the first recesses 120,125 and the pivot posts 331 shift to front ends 2402 of the pivotal grooves 123 finally as best shown in FIG. 6.

Referring to FIGS. 2-5, after the shell 3 is rotated into a horizontal position, the locking elements 332,333 slide into the second recesses 122,126 and the tabs 334 press against to the front face of the second recesses 122,126 to prevent the shell 3 from being taken away from the housing 1 in an upright direction.

Referring to FIG. 5, during the shell 3 is rotating with respect to the housing 1, the pivot posts 331 rotate around a first axis position A1, which has a first distance H1 between the first axis position A1 and the mounting face. During the shell 3 is sliding to the locking grooves in a second axis position A2, which has a second distance H2 between the second axis position A2 and the mounting face. The first distance H1 is greater than the second distance H2, such that the metal shell can rotate smoothly due to the great space in rotate progress and also ensure the locking performance in slide progress.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector, comprising: an insulative housing defining a mounting face, a pair of pivotal grooves on opposite sides of a rear end of the housing and a pair of locking recesses in front of the pivotal grooves respectively; a plurality of contacts arranged in the housing; a metal shell defining a pair of pivotal posts assembled in the pivotal grooves and a pair locking tabs to couple with the pair of locking recesses in a condition that the metal shell rotates to cover on the insulating housing and move forwards; wherein each of the groove defines an elongate axis which is inclined to the mounting face, such that the pivotal posts move closer to the mounting face when the locking tab is finally settled in the recess, wherein the pivotal grooves tilt toward the mounting face in a rear-to-front direction, wherein the pivotal grooves linearly tilt toward the mounting face.

2. The electrical connector as claimed in claim 1, wherein the locking recesses are located on a front end of the housing opposite to the rear end of the housing.

3. The electrical connector as claimed in claim 2, wherein the locking recess is in a L-shaped configuration and comprises a vertical recess running through a top face of the housing and a horizontal recess extending from the vertical recess to the front end of the housing.

4. The electrical connector as claimed in claim 3, wherein two pairs of locking recesses are defined on the opposite sides of the housing arranged in the rear-to-front direction.

5. The electrical connector as claimed in claim 3, wherein the housing forms a guiding opening from each pivotal groove to the mounting face.

6. An electrical connector comprising: a housing unit defining an upward mating face; a plurality of contacts disposed in the housing with contacting sections extending above the mating face; a cover with a rear end section pivotally mounted to a rear end region of the housing unit with a pivot axis moveable relative to the housing unit in a front-to-back direction; a coupling structure formed around the rear end region of the housing and the rear end section of the cover, and including a pivotal groove formed on one of the housing and the cover, and a pivotal post formed on the other; wherein said pivotal groove extends in a front-to-back direction in a slightly tilting manner, wherein the pivotal groove is formed in the housing and the pivotal post is formed on the cover, wherein the pivotal groove is tilted upwardly along the front-to-back direction.

* * * * *